US007093073B2

United States Patent
Truty

(10) Patent No.: US 7,093,073 B2
(45) Date of Patent: Aug. 15, 2006

(54) SYSTEMS AND METHODS FOR ADJUSTING CACHING POLICIES FOR WEB SERVICE REQUESTS

(75) Inventor: Gregory Louis Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 10/607,463

(22) Filed: Jun. 26, 2003

(65) Prior Publication Data

US 2004/0267906 A1 Dec. 30, 2004

(51) Int. Cl.
G06F 12/00 (2006.01)
G06F 15/16 (2006.01)

(52) U.S. Cl. ..................... 711/118; 711/129; 711/160; 709/219

(58) Field of Classification Search ..................... None
See application file for complete search history.

(56) References Cited

U.S. PATENT DOCUMENTS 6,772,203 B1 * 8/2004 Feiertag et al. ............. 709/219

2002/0156979 A1 * 10/2002 Rodriguez ................... 711/129
2004/0054860 A1 * 3/2004 Dixit et al. ................ 711/160

* cited by examiner

Primary Examiner—Mano Padmanabhan
Assistant Examiner—Duc T Doan
(74) Attorney, Agent, or Firm—Winstead Sechrest & Minick P.C.; Herman Rodriguez

(57) ABSTRACT

A mechanism for caching Web services requests and responses, including testing an incoming request against the cached requests and associated responses is provided. The requests are selectively tested against the cached data in accordance with a set of policies. If a request selected hits in the cache, the response is served up from the cache. Otherwise, the request is passed to the corresponding Web-services server/application. Additionally, a set of predetermined cache specifications for generating request identifiers may be provided. The identifier specification may be autonomically adjusted by determining cache hit/cache miss ratios over the set of identifier specifications and over a set of sample requests. The set of specifications may then be sorted to reflect the performance of the respective cache specification algorithms for the current mix of requests.

20 Claims, 4 Drawing Sheets

SYSTEMS AND METHODS FOR ADJUSTING CACHING POLICIES FOR WEB SERVICE REQUESTS

TECHNICAL FIELD

The present invention relates in general to data processing systems, and particularly to data processing systems for providing web services and mechanisms for autonomically selecting caching policies and specifications for web service requests.

BACKGROUND INFORMATION

The advent of networked data processing systems, and particularly the network of networks referred to as the Internet, has spurred the introduction of distributed data processing services. In such systems, a client, typically remotely connected to the service provider via one or more networks, accesses data processing services which are implemented on the remote data processing system which then returns the results of the data processing activity to the client.

It has become common to use the services represented by the World Wide Web (WWW) with it's graphical user interface (GUI) orientation to provide the interface to such distributed data processing services. Typically, in such data processing systems, the client sends a request to a server. On the server side, the system builds a Web page for returning the response to the requesting client. The Web page includes code that may be interpreted on a Web browser running on the client machine which, in response to the code, displays the page on a conventional display such as a CRT or LCD monitor connected to the client machine. The Web page may include dynamic data, that is, data that is changing in time, indeed, may be continuously changing in time; stock quotations are an example. This dynamic data may be generated by server-side application software. This application software need not reside on the same hardware as the page server, but may be deployed on other systems that may be remote from both the client and the page server. Such distributed, application-to-application data processing implementations, which are typically XML-based request responses may, generically, be referred to as web services.

The dynamic data is generated in response to a Web services request issued by the client application based on information included in the code for the web page being executed. Typically, Web services requests are XML-based (XML refers to the eXtensible Markup language) requests encoded in SOAP (Simple Object Access Protocol) and use HTTP (HyperText Transport Protocol) as the transport mechanism. However, Web services requests are not required to use either XML, SOAP or HTTP.

To reduce traffic on the network, caching of Web service requests responses may be used. In this way, subsequent requests for the same web service may be served up from the cache. To associate cached information with an incoming request, an identifier is generated from the information in the incoming request to uniquely identify it.

The servicing of such a request may be understood by referring to FIG. 1 illustrating an exemplary process 100 for responding to a Web service request. In step 102, the incoming request is received. From the information in the request, an identifier is calculated in accordance with a predetermined algorithm.

If the identifier is in the cache, the associated response stored in the cache is served up, step 108. Otherwise, the request is issued to the Web services server. The response may then be cached along with the identifier from the original request, step 112.

The selection of information used to formulate an identifier affects the performance of a system in responding to end-user requests. The system may expend a significant fraction of its resources calculating identifiers and, if the selection criteria are poor, the hit rate will be low. Consequently, system resources are expended in fruitless calculations of identifiers and, particularly during peak periods, the response time to end-users may be adversely impacted.

Consequently, there is a need in the art for mechanisms to automatically adjust to caching utilization and, to autonomically adjust cache identifier specifications.

SUMMARY OF THE INVENTION

The aforementioned needs are addressed by the present invention. Accordingly, there is provided in one embodiment a computer program product embodied in a tangible storage medium. The computer program product includes a program of instructions for sampling received web services requests using a predetermined policy. A cache identifier is generated from the request information using a cache identifier specification. If said cache identifier hits in a request cache, a first counter is incremented. Otherwise, if the cache identifier does not hit in said request cache, a second counter is incremented.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
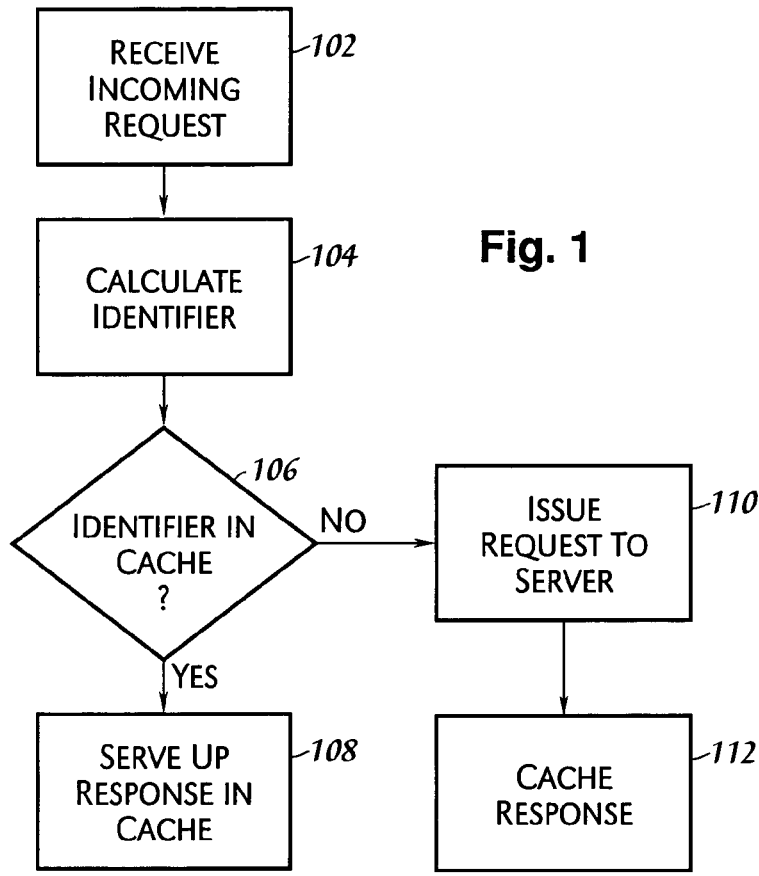
FIG. 1 illustrates, in flowchart form, a methodology for responding to Web services requests which may be used in conjunction with the present invention.

A mechanism for caching Web services requests and responses, and serving cached responses is provided. In particular, caching operations, include testing an incoming request against the cached requests and associated responses. The requests are selectively tested against the cached data in accordance with a set of policies. If a request selected hits in the cache, the response is served up from the cache. Otherwise, the request is passed to the corresponding Web-services server/application. Additionally, a set of predetermined cache specifications for generating request identifiers may be provided. The identifier specification may be autonomically adjusted by determining cache hit/cache miss ratios over the set of identifier specifications and over a set of sample requests. The set of specifications may then be sorted to reflect the performance of the respective cache specification algorithms for the current mix of requests.

In the following description, numerous specific details are set forth to provide a thorough understanding of the present invention. For example, particular policies and specifications may be described, however, it would be recognized by those of ordinary skill in the art that the present invention may be practiced without such specific details, and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral for the several views.

Figure 2:
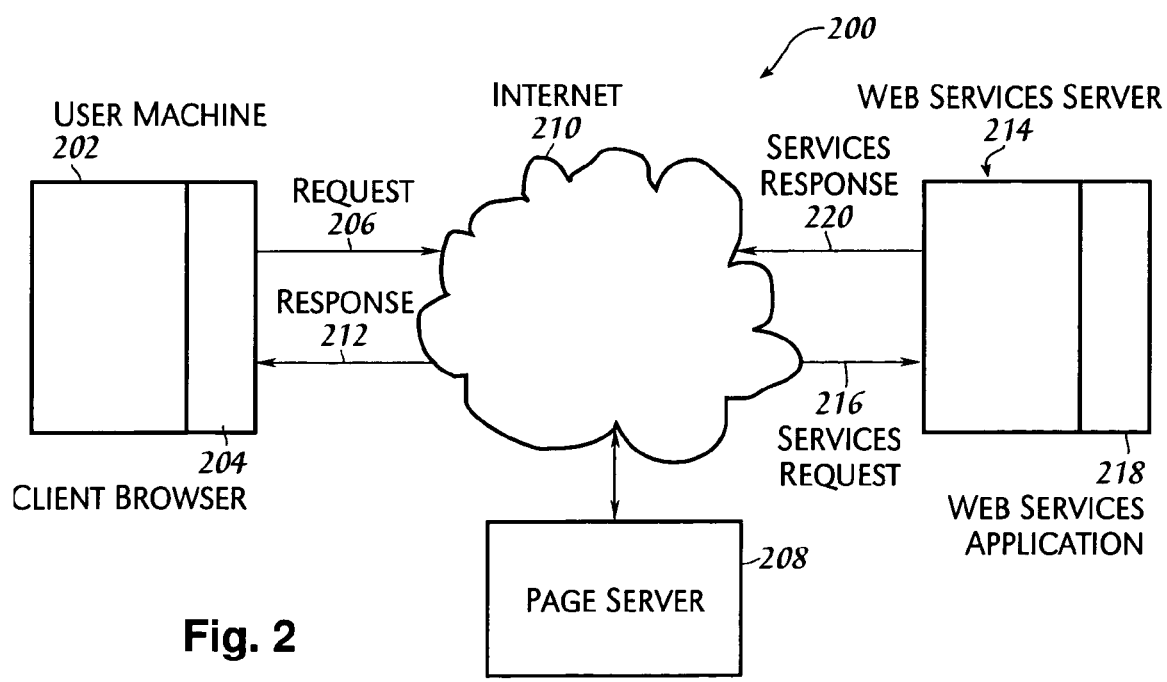
FIG. 2 illustrates, in block diagram form, an exemplary architecture for accessing web services which May be used in conjunction with the present invention.

Referring to FIG. 2, there is illustrated a distributed data processing system architecture 200 which may be used for accessing web services in accordance with the present inventive principles. (Architecture 200 may be understood as a logical view of the architecture of a distributed data processing system. In other words, web services server 214 may be viewed as a logically distinct component, whether physically deployed on the same, or, alternatively, different hardware as page server 208.) Currently, a web service is accessed when a request for a web document, or page, is received from a user machine, such as user machine 202, running a client web browser 204. Client browser 204 initiates a request 206, which is transmitted to the targeted web server, illustrated by page server 208, in FIG. 2, via a network, shown in FIG. 2 as Internet 210.

Page server 208 responds to the request by returning the requested page in response 212. The requested page may include data that is to be generated dynamically. Such dynamic data may be generated locally on the user machine in response to client browser 204 executing the script defining the page returned in response 212. Additionally, dynamic data may be generated by a remote process. This may further be in response to code in the page returned by page server 208 in response 212 via a request to a remote server, such as web services server 214. On execution of the page received in response 212, the corresponding code in the page generates service request 216 which is directed to web services server 214. Web services 214 may execute a web service 218 in a response that generates the dynamic data. The data is returned in a services response 220 to page server 208, which displays the data in accordance with the code defining the page, which may be, for example, an HTML (Hypertext Markup Language) script.

To request the web service for generating the dynamic data, the page sent to client browser 204 in response 212 must have the appropriate code to access the web service. For example, the request may be embedded in a SOAP message. SOAP is a protocol for the exchange of information in a distributed environment. SOAP is a proposed standard, promulgated by the W3C (World Wide Web Consortium). (The draft specifications for SOAP 1.2 may be found in Simple Object Access Protocol 1.2, http://www.w3.org/TR/SOAP12.)

Figure 3:
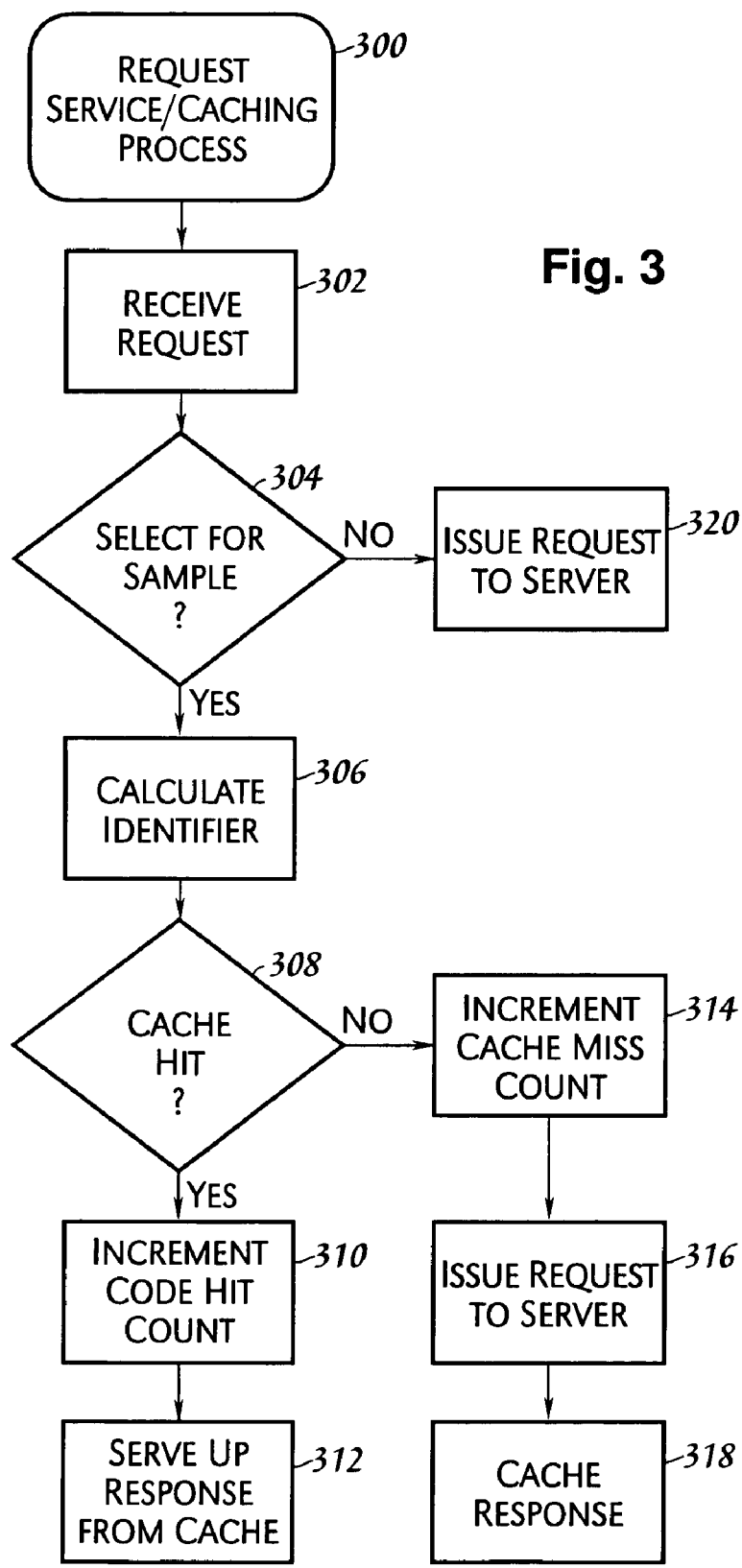
FIG. 3 illustrates, in flowchart form, a methodology for servicing Web service requests in accordance with an embodiment of the present invention.

Refer now to FIG. 3 illustrating, in flowchart form, a request service/caching process 300 in accordance with the principles of the present invention. Note that the flowcharts provided herein are not necessarily indicative of the serialization of operations being performed in an embodiment of the present invention. Steps disclosed within these flowcharts may be performed in parallel. The flowcharts are indicative of those considerations that may be performed to produce the operation available for responding to the Web services requests, caching of responses and autonomically adjusting request identifier specifications. It is further noted that the order presented is illustrative and does not necessarily imply that the steps must be performed in the order shown.

In step 302, a Web services request is received. If, in step 304 the request received in step 302 is selected as a sample for testing against the cache, in step 306, the identifier is calculated from the information in the request in accordance with a preselected algorithm which defines the rules for generating the cache identifier. Note that requests may be sampled in accordance with a policy setting out the sampling criteria. Such policies may include, for example, central processing unit (CPU) availability. That is, if CPU usage is under a threshold, which may be preselected, then select the incoming request as a sample. Another policy which may be used in accordance with the present inventive principles is to sample every nth request. The value of n may itself be selectable. Another policy which may be used is random selection of incoming requests as samples. Another alternative may be time-based sampling in which all requests received during particular time intervals within a select period, daily for example, may be sampled. The particular time intervals may be preselected as part of the policy. Such a policy may be useful to reflect the situation in which certain workloads typically come in at certain times of the day. It would be recognized by those of ordinary skill in the art that the foregoing list of policies is non-exclusive, and the present inventive principles may be applied using other policies, and such embodiments would fall within the spirit and scope of the present invention. Note to that a combination of policies may also be used to determine the sampled requests. For example, one policy may be applied for a selected period of time and a second policy used for another time interval. Such combination of sampling policies may be used to mitigate against inconsistencies in the performance measures. Thus, for example, in a CPU-type policy, the cache identifiers are only calculated when CPU activity is low, is that the workload may be low (perhaps during late night hours). However, it may be more useful to leverage caching during the day, when the system is being battered by outside requests. These requests may "look" different that those received during the lulls in CPU activity night, and yield a different set of data. In this case, sampling the requests over a spectrum (such as every 10th request) for example, may more accurately capture the type of workload that is being received. Another alternative to more accurately capture the received workloads may be to break the policies into groups (in which, for example, an algorithm that you is used use for nighttime hours, and another for daytime hours).

In step 308 is determined if there is a hit in the cache of Web services requests. The determination of the cache hit (or conversely a miss) is made using the identifier calculated in step 306. If in step 308 a cache hit occurs, in step 310 a cache hit count is incremented and the response is served up from the cached response.

If, however, in step 308 the request misses in the cache, a cache miss count is incremented in step 314, and the request is issued to the web services server, for example, Web services server 214, FIG. 2. In step 318, the response is cached.

Returning to step 304, if the request received in step 302 is not selected for the sample, the request is issued to the server in step 320. In an embodiment of a data processing system such as system 200 in FIG. 2, this request may for example be services request 216.

Figure 4:
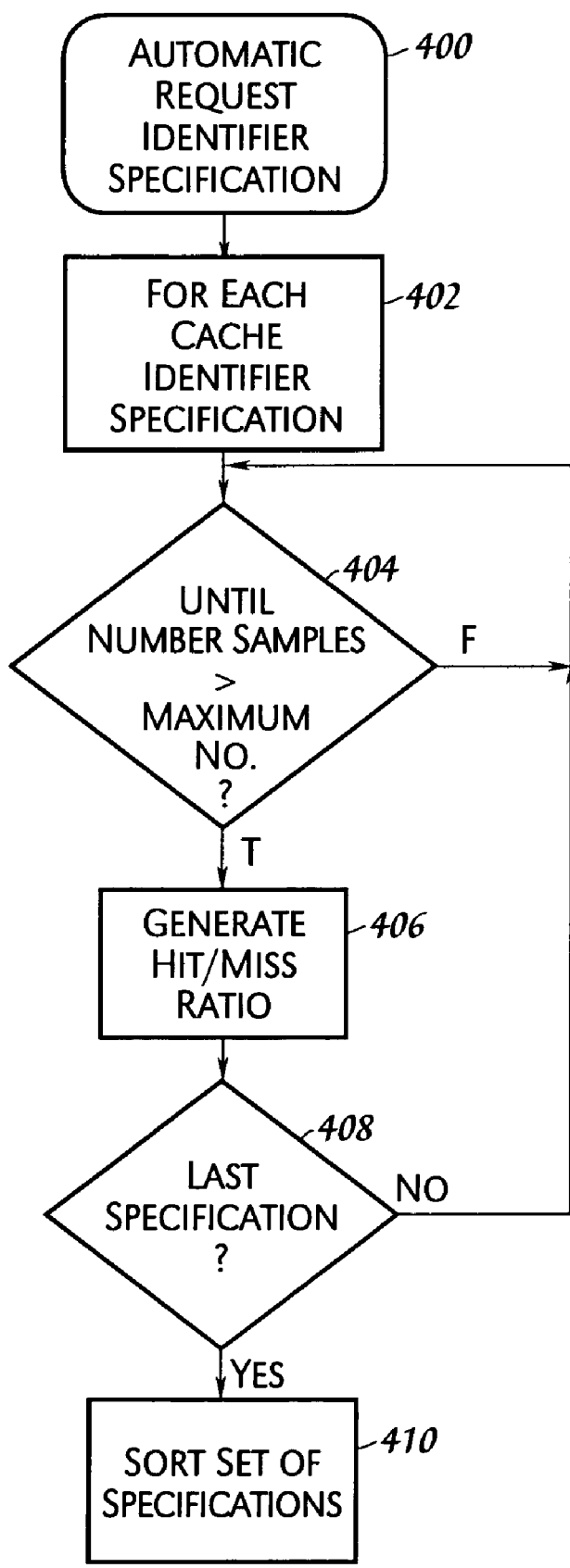
FIG. 4 illustrates, in flowchart form, a methodology for autonomically adjusting a cache identifier specification.

Refer now to FIG. 4 illustrating, in flowchart form, an autonomic request identifier specification methodology 400 in accordance with the principles of the present invention. Recall, as discussed hereinabove, that the effectiveness of the caching of Web services responses depends on the rules specifying the determination of the cache identifier. A set of cache identifier specifications may be provided, each defining a rule, or algorithm, for generating a cache identifier from the information in a corresponding request. Algorithms for calculating cache identifiers may use various pieces of information (from information within the HTTP Header, and information in the SOAP request (which may be the SOAP header or SOAP envelope). Information in the HTTP header includes the IP address from which the request came, user/password tokens, HTTP session identifier tokens, URL request string, etc. Information in the SOAP header can include business data (security or information specific to an enterprise), security information, application data (such as, in the stockquote example, the requested stock quote symbol). Alternative algorithms may use different selections of these elements of the request to calculate the cache identifier. Another alternative may hash the bytestream of the request. It would be recognized by those of ordinary skill in the art that the use of one alternative or another may trade off performance with respect to cache hits and computational cost. In step 402, methodology 400 enters a loop over cache identifier specifications. In step 404, the process loops until a number of samples using the current cache identifier specification from the set is accumulated, in accordance with the methodology described in conjunction with FIG. 3. Note that the number of threshold samples may be selected such that a statistically meaningful set of samples is accumulated. The number of samples may be chosen such that, for example, the relative error in the average number of hits for the particular algorithm is less than a preselected value. It would be appreciated by those of ordinary skill in the art that the relative error diminishes with sample size, in particular is inversely proportional to the square root of the sample size.

When the threshold number of samples is exceeded, methodology 400 breaks out of the loop in step 404 and, in step 406 generates a cache hit/miss value. This may be obtained using the cache hit count and cache miss count from a request services/caching process in accordance with an embodiment of the methodology in FIG. 3.

In step 408, methodology 400 returns to step 404 to repeat the process for a next cache identifier specification in the set, and steps 404–408 are repeated until all specifications in the set have been evaluated. Then, in step 410, the set of cache identifier specifications may be ordered in accordance with the value of the corresponding hit/miss ratios generated in step 406. In this way, the system may be autonomically adjusted to improve the probability of a cache hit based on an algorithm that is empirically determined to generate cache identifiers that more accurately represent the requests themselves. In other words, cache identifiers that are recognized as representing requests for the same data, whereby the data can be supplied from a cached response.

Figure 5:
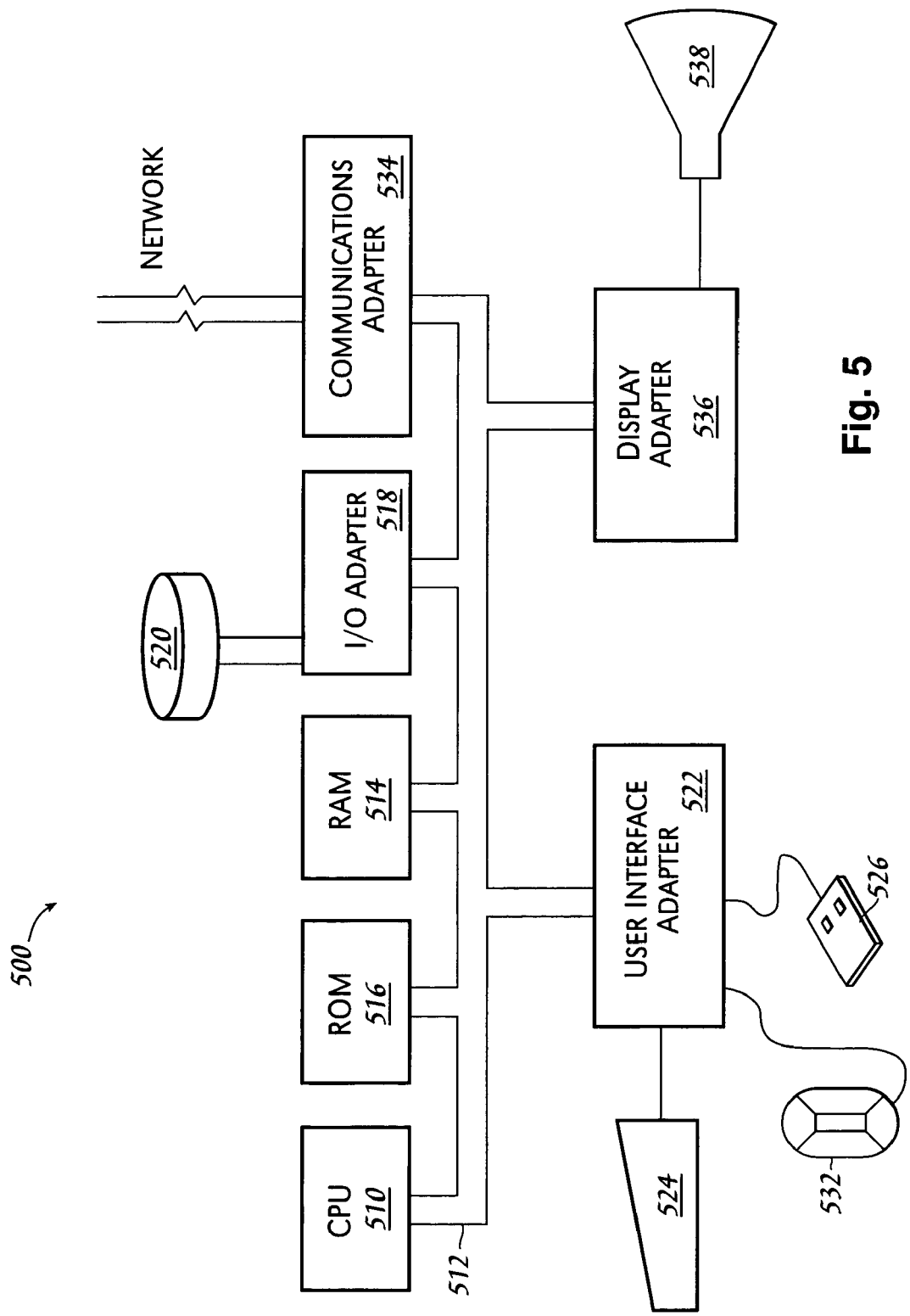
FIG. 5 illustrates, in block diagram form, a data processing system which may be used in conjunction with the methodologies of FIGS. 2 and 3 in an alternative embodiment of the present invention.

FIG. 5 illustrates an exemplary hardware configuration of data processing system 500 in accordance with the subject invention. The system in conjunction with the methodologies illustrated in FIGS. 3 and 4 may be used, for web service request responses and caching operations, and autonomically adapting cache identifier specifications in accordance with the present inventive principles. Data processing system 500 includes central processing unit (CPU) 510, such as a conventional microprocessor, and a number of other units interconnected via system bus 512. Data processing system 500 also includes random access memory (RAM) 514, read only memory (ROM) 516 and input/output (I/O) adapter 518 for connecting peripheral devices such as disk units 520 to bus 512, user interface adapter 522 for connecting keyboard 524, mouse 526, trackball 532 and/or other user interface devices such as a touch screen device (not shown) to bus 512. System 500 also includes communication adapter 534 for connecting data processing system 500 to a data processing network, enabling the system to communicate with other systems, and display adapter 536 for connecting bus 512 to display device 538. CPU 510 may include other circuitry not shown herein, which will include circuitry commonly found within a microprocessor, e.g. execution units, bus interface units, arithmetic logic units, etc. CPU 510 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. These sets of instructions, in conjunction with system components that execute them may perform web services response caching operations and autonomic adaptation of cache identifier specifications as described hereinabove. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A computer program product embodied in a tangible storage medium, the program product including programming instructions for:
    sampling received Web requests using a predetermined policy;
    generating a cache identifier from information in sampled Web requests using a cache identifier specification;
    if said cache identifier hits in a request cache, incrementing a first counter; and
    if said cache identifier does not hit in said request cache, incrementing a second counter.

2. The computer program product of claim 1 further comprising programming instructions for:
    serving a cached response if said cache identifier hits in said request cache; and
    passing said request to a Web request server if said cache identifier does not hit in said request cache.

3. The computer program product of claim 1 wherein said predetermined policy comprises a member of a set of request sampling policies, and wherein each policy of said set of request sampling policies is selectable in response to statistical characteristics of said Web requests.

4. The computer program product of claim 1 wherein said cache identifier specification comprises a member of a predetermined set of cache identifier specifications, and wherein each member of said set of cache identifier specifications is selectable in response to a performance measure derived from values in said first and second counters.

5. The computer program product of claim 4 further comprising programming instructions for sorting said set of cache identifier specifications in accordance with corresponding values of said performance measure.

6. The program product of claim 4 further comprising programming instructions for accumulating a statistical sample for each member of said set of cache identifier specifications, and wherein said value of said measure of performance comprises a ratio of cache hits to cache misses accumulated over said statistical sample.

7. The program product of claim 1 wherein said predetermined policy comprises one of a central processing unit (CPU) availability policy, every nth request policy, random selection policy and time-based policy.

8. A method for Web request caching operations comprising:
    sampling received Web requests using a predetermined policy;
    generating a cache identifier from information in sampled Web requests using a cache identifier specification;
    if said cache identifier hits in a request cache, incrementing a first counter; and
    if said cache identifier does not hit in said request cache, incrementing a second counter.

9. The method of claim 8 further comprising:
    serving a cached response if said cache identifier hits in said request cache; and
    passing said request to a Web request server if said cache identifier does not hit in said request cache.

10. The method of claim 8 wherein said predetermined policy comprises a member of a set of request sampling policies, and wherein each policy of said set of request sampling policies is selectable in response to statistical characteristics of said Web requests.

11. The method of claim 8 wherein said cache identifier specification comprises a member of a predetermined set of cache identifier specifications, and wherein each member of said set of cache identifier specifications is selectable in response to a performance measure derived from values in said first and second counters.

12. The method of claim 11 further comprising sorting said set of cache identifier specifications in accordance with corresponding values of said performance measure.

13. The method of claim 11 further comprising accumulating a statistical sample for each member of said set of cache identifier specifications, and wherein said value of said measure of performance comprises a ratio of cache hits to cache misses accumulated over said statistical sample.

14. The method of claim 8 wherein said predetermined policy comprises one of a central processing unit (CPU) availability policy, every nth request policy, random selection policy and time-based policy.

15. A data processing system for Web request caching operations comprising:
    circuitry operable for sampling received Web requests using a predetermined policy;
    circuitry operable for generating a cache identifier from information in sampled Web requests using a predetermined policy;
    circuitry operable for, if said cache identifier hits in a request cache, incrementing a first counter; and
    circuitry operable for, if said cache identifier does not hit in said request cache, incrementing a second counter.

16. The data processing system of claim 15 further comprising:
    circuitry operable for serving a cached response if said cache identifier hits in said request cache; and
    circuitry operable for passing said request to a Web request server if said cache identifier does not hit in said request cache.

17. The data processing system of claim 15 wherein said predetermined policy comprises a member of a set of request sampling policies, and wherein each policy of said set of request sampling policies is selectable in response to statistical characteristics of said Web requests.

18. The data processing system of claim 15 wherein said cache identifier specification comprises a member of a predetermined set of cache identifier specifications, and wherein each member of said set of cache identifier specifications is selectable in response to a performance measure derived from values in said first and second counters.

19. The data processing system of claim 18 further comprising circuitry operable for sorting said set of cache identifier specifications in accordance with corresponding values of said performance measure.

20. The data processing system of claim 18 further comprising circuitry operable for accumulating a statistical sample for each member of said set of cache identifier specifications, and wherein said value of said measure of performance comprises a ratio of cache hits to cache misses accumulated over said statistical sample.

* * * * *